US012567547B2

(12) United States Patent
Hofsaess

(10) Patent No.: US 12,567,547 B2
(45) Date of Patent: Mar. 3, 2026

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 273 days.

(21) Appl. No.: 18/232,784

(22) Filed: Aug. 10, 2023

(65) Prior Publication Data

US 2024/0055206 A1 Feb. 15, 2024

(30) Foreign Application Priority Data

Aug. 12, 2022 (DE) ......................... 102022120445.6

(51) Int. Cl.
*H01H 37/54* (2006.01)
*H01H 37/04* (2006.01)

(52) U.S. Cl.
CPC ...... *H01H 37/5436* (2013.01); *H01H 37/043* (2013.01); *H01H 37/5409* (2013.01)

(58) Field of Classification Search
CPC ............. H01H 37/5436; H01H 37/043; H01H 37/5409
USPC ............................................................ 337/365
See application file for complete search history.

(56) References Cited

U.S. PATENT DOCUMENTS 3,715,699 A * 2/1973 Hire .................... H01H 37/5409 337/348
4,053,859 A * 10/1977 Hollweck .......... H01H 37/5409 337/348
4,306,211 A * 12/1981 Hofsass ................. H01H 37/54 337/380
4,470,033 A * 9/1984 Hofsass ............. H01H 37/5427 337/365
5,615,072 A * 3/1997 Hofsass ............. H01H 37/5427 361/105
5,828,286 A * 10/1998 Hofsass ............. H01H 37/5427 337/380
5,867,085 A * 2/1999 Kruck ................ H01H 37/5427 337/380
5,877,671 A * 3/1999 Hofsass ............. H01H 37/5427 337/380
6,724,293 B1 * 4/2004 Hofsass ................. H01H 37/04 337/380
6,781,504 B2 * 8/2004 Scott .................... H01H 37/043 337/380

(Continued)

FOREIGN PATENT DOCUMENTS

DE 2121802 A1 1/1973
DE 10 2011 119 632 B2 4/2013

(Continued)

OTHER PUBLICATIONS

Search Report of corresponding European Patent Application No. 23189393.4 issued on Jan. 17, 2024.

(Continued)

*Primary Examiner* — Anatoly Vortman
(74) *Attorney, Agent, or Firm* — Knobbe, Martens, Olson & Bear, LLP

(57) ABSTRACT

A temperature-dependent switch, comprising a temperature-dependent switching mechanism having a switching mechanism unit and a switching mechanism housing, in which the switching mechanism unit is arranged and held captively therein. Furthermore, the switch comprises a switch housing, in which the switching mechanism housing is arranged and held captively therein.

16 Claims, 4 Drawing Sheets

(56) References Cited

U.S. PATENT DOCUMENTS

| | | | | |
|---|---|---|---|---|
| 8,536,972 | B2 * | 9/2013 | Hofsaess ............ | H01H 37/5427 337/380 |
| 10,256,061 | B2 | 4/2019 | Neumann | |
| 10,439,196 | B2 | 10/2019 | Bourns et al. | |
| 10,861,662 | B2 * | 12/2020 | Hofsaess ................ | H01H 37/52 |
| 10,985,552 | B2 | 4/2021 | Tada et al. | |
| 11,004,634 | B2 | 5/2021 | Namikawa | |
| 11,239,037 | B2 | 2/2022 | Namikawa | |
| 11,264,194 | B2 * | 3/2022 | Hofsaess ................ | H01H 37/04 |
| 11,329,325 | B2 | 5/2022 | Namikawa | |
| 11,373,826 | B2 | 6/2022 | Namikawa | |
| 11,476,066 | B2 | 10/2022 | Hofsaess | |
| 11,551,895 | B2 | 1/2023 | Namikawa | |
| 11,615,930 | B2 | 3/2023 | Namikawa | |
| 11,636,991 | B2 | 4/2023 | Miyata | |
| 11,651,922 | B2 | 5/2023 | Tada et al. | |
| 2008/0084260 | A1 * | 4/2008 | Swartzentruber .... | H01H 50/023 335/151 |
| 2012/0286923 | A1 * | 11/2012 | Buettner ................ | H01H 37/64 337/365 |
| 2013/0127585 | A1 | 5/2013 | Hofsaess | |
| 2013/0127586 | A1 * | 5/2013 | Hofsaess .................. | H01H 1/58 337/365 |
| 2013/0271258 | A1 * | 10/2013 | Hofsaess ................ | H01H 1/021 337/298 |
| 2014/0225709 | A1 * | 8/2014 | Kirch ................. | H01H 37/5427 337/365 |
| 2015/0042443 | A1 * | 2/2015 | Mitschele .............. | H01H 37/54 337/365 |
| 2020/0234898 | A1 | 7/2020 | Namikawa | |
| 2024/0055205 | A1 * | 2/2024 | Hofsaess ............ | H01H 37/5409 |
| 2024/0212961 | A1 * | 6/2024 | Hofsaess ................ | H01H 37/54 |
| 2025/0118512 | A1 * | 4/2025 | Hofsaess ................ | H01H 37/04 |

FOREIGN PATENT DOCUMENTS

| | | | |
|---|---|---|---|
| DE | 10 2013 017 232 | A1 | 4/2015 |
| EP | 3796359 | A1 | 3/2021 |
| GB | 1 394 612 | A | 5/1975 |
| WO | WO 2008/006385 | A1 | 1/2008 |

OTHER PUBLICATIONS

Informal English Translation of Examination Report issued in German Application No. DE 10 2022 120 445.6 dated Mar. 10, 2023, 4 pages.

* cited by examiner

TEMPERATURE-DEPENDENT SWITCH

CROSS-REFERENCE TO RELATED APPLICATIONS

This application claims priority from German patent application DE 10 2022 120 445.6, filed on Aug. 12, 2022. The entire content of this priority application is incorporated herein by reference.

BACKGROUND

This disclosure relates to a temperature-dependent switch.

An exemplary temperature-dependent switch is disclosed in DE 10 2011 119 632 B3.

Temperature-dependent switches of this type are used in a manner known per se to monitor the temperature of a device. For this purpose, for example, the switch is brought via one of its outside surfaces into thermal contact with the device to be protected, and therefore the temperature of the device to be protected influences the temperature of the switching mechanism arranged inside the switch.

The switch is typically electrically connected in series via connecting lines to the supply current circuit of the device to be protected, and therefore, below the response temperature of the switch, the supply current of the device to be protected flows through the switch.

The switch disclosed in DE 10 2011 119 632 B3 comprises a switch housing, in the interior of which a switching mechanism is hermetically sealed. The switch housing is constructed in two parts. It comprises a lower part which is firmly connected to a cover part with the interposition of an insulating film. The switching mechanism is clamped between the cover part and the lower part. The switching mechanism is firstly inserted loosely into the lower part when the switch is manufactured. The insulating film is then pulled over the lower part and the cover part is placed onto said film and firmly connected to the lower part.

The temperature-dependent switching mechanism arranged in the switch housing comprises a snap-action spring disc to which a movable contact part is fastened, and also a bimetallic snap-action disc which is pulled over the movable contact part. The snap-action spring disc presses the movable contact part against a stationary mating contact, which is arranged on the inside of the switch housing on the cover part. With its outer edge, the snap-action spring disc is supported in the lower part of the switch housing such that the electrical current flows from the lower part through the snap-action spring disc and the movable contact part into the stationary mating contact and from there into the cover part.

The temperature-dependent switching behaviour of the switch is essentially caused by the temperature-dependent bimetallic snap-action disc. The latter is usually formed as a multi-layered, active, sheet-like component consisting of two, three or four interconnected component parts having different thermal coefficients of expansion. In the case of bimetallic snap-action discs of this type, the connection of the individual layers of metals or metal alloys is usually integrally bonded or form-fitting and is achieved, for example, by rolling.

A bimetallic snap-action disc of this type has a first stable geometric configuration (low-temperature configuration) at low temperatures, below the response temperature of the bimetallic snap-action disc, and a second stable geometric configuration (high-temperature configuration) at high temperatures, above the response temperature of the bimetallic snap-action disc. The bimetallic snap-action disc jumps from its low-temperature configuration to its high-temperature configuration depending on the temperature in the manner of hysteresis. This process is often referred to as "snapping-over", which is also the reason for the term "snap-action disc".

If the temperature of the bimetallic snap-action disc increases beyond the response temperature of the bimetallic snap-action disc as a result of an increase in the temperature of the device to be protected, said snap-action disc switches from its low-temperature configuration to its high-temperature configuration. As a result, the moving contact part is lifted off the stationary mating contact, and therefore the switch opens and the device to be protected is switched off and cannot heat up further.

If no switch-back lock is provided, the bimetallic snap-action disc snaps back into its low-temperature configuration, with the result that the switch is closed again as soon as the temperature of the bimetallic snap-action disc drops below what is referred to as the spring-back temperature of the bimetallic snap-action disc as a result of the cooling of the device to be protected.

In a plurality of temperature-dependent switches, the bimetallic snap-action disc is preferably inserted into the switch housing as a loose individual part during the manufacturing of the switch, the bimetallic snap-action disc being, for example, pulled with a central through hole provided therein over the contact part fastened to the snap-action spring disc. Only by closing the switch housing is the bimetallic snap-action disc then fixed in its position and its position defined relative to the other components of the switching mechanism. However, the production of such a switch, in which the bimetallic snap-action disc is used individually, has proved to be relatively cumbersome, since a plurality of steps are necessary for inserting the switching mechanism into the switch housing.

In the case of the switch disclosed in DE 10 2011 119 632 B3, the bimetallic snap-action disc is already connected beforehand (outside the switch housing) to the contact part fastened to the snap-action spring disc. For this purpose, the bimetallic snap-action disc is pulled over the contact part and then an upper collar of the contact part is folded over. As a result, not only is the snap-action spring disc fastened to the contact part, but also the bimetallic snap-action disc held captively thereon.

The switching mechanism, consisting of the bimetallic snap-action disc, the snap-action spring disc and the contact part, can thus be manufactured in advance as a semi-finished product, which forms a captive unit and can be stored separately as bulk material. During the manufacturing of the switch, the switching mechanism can then be inserted into the switch housing as a captive unit. This very much simplifies the production of the switch.

The snap-action spring disc is welded or soldered to the contact part of the switch disclosed in DE 10 2011 119 632 B3 in order to establish the best possible electrical contact between these two components. However, it has been shown that the welded or soldered connection between the contact part and the snap-action spring disc may break during the storage of the bulk material, especially when the switching mechanism is produced in advance as a semi-finished product. Of course, defective switches of this type can then no longer be used. However, it is problematic that defects at the switching mechanism can often only be detected after the entire switch has been installed, since functional testing of the switching mechanism is only possible when the switch is fully assembled.

SUMMARY

It is an object to provide a temperature-dependent switch, the switching mechanism of which can be produced in advance as a semi-finished product without being susceptible to damage, and with which functional testing of the switching mechanism is already possible before its final installation in the switch. In addition, the switch is intended to be comparatively easy to mount, have a low overall height and be configured to be comparatively pressure-stable.

According to an aspect, a temperature-dependent switch is presented which comprises the following components:

- a temperature-dependent switching mechanism having a switching mechanism unit, which comprises a movable contact part coupled to a bimetallic snap-action disc, and having a switching mechanism housing, in which the switching mechanism unit is arranged and held captively therein;
- a switch housing, in which the switching mechanism housing is arranged and held captively therein, wherein the switch housing comprises a stationary contact part, which acts as a mating contact to the movable contact part; and
- an insulator arranged inside the switch housing:
- wherein the switching mechanism housing surrounds the switching mechanism unit from a first housing side, a second housing side opposite the first housing side, and a housing circumferential side extending between and transversely to the first and the second housing sides,
- wherein the switching mechanism housing on the first housing side comprises an opening through which the movable contact part interacts preferably directly with the stationary contact part,
- wherein the switching mechanism housing comprises an electrically conductive base body, which forms at least part of the second housing side, said part of the second housing side forming a freely accessible outside of the temperature-dependent switch, and
- wherein the insulator electrically insulates the base body of the switching mechanism housing from the switch housing.

The presented switch comprises a switching mechanism, which comprises an additional switching mechanism housing, in which the switching mechanism unit, which comprises the bimetallic snap-action disc and the movable contact part, is held captively. The switching mechanism housing surrounds the switching mechanism unit namely both from a first housing side and from a second housing side opposite the first housing side, and also from a housing circumferential side extending between and transversely to the first and the second housing sides. The switching mechanism housing thus surrounds the switching mechanism unit from all six spatial directions at least partially in each case, and therefore the switching mechanism cannot drop out of the switching mechanism housing.

The switching mechanism, including the switching mechanism unit and including the switching mechanism housing surrounding the switching mechanism unit, can thus be produced in advance as a semi-finished product before being inserted into the switch. The switching mechanism, which is produced in advance as a semi-finished product, can be stored as bulk material. During this bulk material storage, the fragile components of the switching mechanism unit, in particular the bimetallic snap-action disc and the movable contact part, are protected from the switching mechanism housing. Damage to these fragile components during the bulk material storage is very substantially excluded, since the fragile components of the switching mechanism unit are securely encapsulated in the switching mechanism housing.

However, the switching mechanism housing not only affords the advantage of secure storage of the switching mechanism unit arranged therein; it also enables a much simpler way of producing the temperature-dependent switch. Unlike a conventional switch housing, the switching mechanism housing which is now additionally provided is not a closed housing in which the switching mechanism is hermetically sealed, but rather a partially open housing which comprises an opening on the first housing side, through which the movable contact part is accessible from outside the switching mechanism housing. The switching mechanism can thus be inserted together with the switching mechanism housing as a unit into a surrounding switch housing which is constructed in a simplified manner and forms the final switch housing. A stationary contact part, which acts as a mating contact to the movable contact part and interacts with the movable contact part of the switching mechanism through the opening in the switching mechanism housing, is arranged on this switch housing. Preferably, the movable contact part interacts directly with the stationary contact part through the opening. In the low-temperature position of the switch, the movable contact part contacts the stationary contact part through the opening.

In the production of the temperature-dependent switch, the switching mechanism together with its switching mechanism housing can thus firstly be produced in advance as a semi-finished product and then inserted as a whole into the switch housing. This greatly simplifies not only the storage of the switching mechanism, but also the production of the temperature-dependent switch.

The second housing side and the circumferential side of the switching mechanism housing are preferably each closed housing sides, while the first housing side is only a partially closed or a partially open housing side because of the aforementioned opening.

However, since the first housing side of the switching mechanism housing is at least partially closed and at least partially surrounds the switching mechanism unit also from this side, the switching mechanism unit is securely encapsulated in the switching mechanism housing. This opens up the possibility of performing functional testing of the switching mechanism with the semi-finished product produced in advance, even before it is installed in the switch housing.

The switching mechanism housing comprises an electrically conductive base body, which forms at least part of the second housing side. Preferably, the base body forms the entire second housing side and at least part of the housing circumferential side.

In the fully assembled state of the switch, the electrically conductive base body formed on the second housing side of the switching mechanism housing forms a freely accessible outside of the switch. This part of the switching mechanism housing is therefore not surrounded by the switch housing when the switch is completely installed. Thus, this part of the switching mechanism housing can serve as a direct electrical connection surface of the switch. A second electrical connection is preferably part of the outside of the switching mechanism housing, which is electrically insulated from the switching mechanism housing by means of an insulator.

Thus, the switching mechanism housing is preferably thus only partially, but not completely, arranged in the switch housing. At least the second side of the switching mechanism housing is freely accessible from the outside.

This type of arrangement, in which the switching mechanism housing is only partially, but not completely, surrounded by the switching mechanism housing, results in a very compact design of the switch. In addition, the switch is extremely pressure-stable because of the additionally provided switching mechanism housing.

According to a refinement, the insulator comprises an annular body.

This annular body can be configured in a circular ring shape, as viewed in top view. However, when viewed in top view, the annular body may in principle also have a polygonal outer contour.

The term "annular body" should therefore be understood as meaning in general. It refers to any body that has a closed contour on the circumferential side. For example, the outer contour, as viewed in top view, may also be designed elliptically or have any free form. The annular body does not necessarily have to be hollow-cylindrical or toroidal, although this is preferred.

The design of the insulator as an annular body has the advantage that the insulator electrically insulates the switching mechanism housing around the entire circumference from the switch housing. In addition, such an annular body can be arranged in a space-saving manner in the switch housing. The annular body is moreover preferably solid, and therefore the insulator forms a mechanically stable component of the switch, which can also serve to support other components of the switch and is easy to handle during the installation of the switch.

According to a further refinement, the insulator is fastened to the base body of the switching mechanism housing.

In this refinement, the insulator thus forms a component belonging to the switching mechanism. Thus, the insulator can be connected to the base body of the switching mechanism housing even before the switch is installed and can be kept in stock together with the latter as a semi-finished product. When the switch is installed, the switching mechanism can then be inserted together with the insulator into the switch housing as one unit. This significantly simplifies the installation of the switch, in particular because alignment and positioning of the switching mechanism housing relative to the insulator no longer has to be carried out during the installation of the switch. Both components are already fixed to each other in advance.

In addition, the fastening of the insulator to the base body of the switching mechanism housing contributes to the compact and pressure-stable design of the switch.

According to a further refinement, at least one holding element, by means of which the insulator is fastened to the base body, is formed on the base body of the switching mechanism housing. Preferably, a plurality of such holding elements are formed on the base body of the switching mechanism housing. Particularly preferably, the at least one holding element is formed integrally on the base body.

The insulator can therefore be very easily connected to the switching mechanism housing. Preferably, the at least one holding element involves one or more holding claws, which can be produced by bending over or crimping a free portion of the base body.

According to a further refinement, the base body of the switching mechanism housing is integrally formed in one piece.

Said one-piece design of the switching mechanism housing further contributes to the compact and pressure-stable design of the switch. It also considerably simplifies the installation of the switch and reduces the number of components in the switch.

According to a further refinement, an outer circumferential surface of the insulator abuts an inner circumferential surface of the switch housing. Preferably, the shape of the outer circumferential surface of the insulator is adapted to the shape of the inner circumferential surface of the switching mechanism housing.

This refinement is particularly advantageous when the insulator is fastened to the base body of the switching mechanism housing. Inserting the switching mechanism housing and the insulator fastened thereto then leads namely directly to the correct positioning and alignment of the switching mechanism relative to the stationary mating contact arranged on the switch housing. Thus, the movable contact part of the switching mechanism is correctly positioned relative to the stationary contact part without any further action.

According to a further refinement, the insulator forms at least a part of the housing circumferential side of the switching mechanism housing and/or at least a part of the first housing side of the switching mechanism housing.

The insulator thus insulates the switching mechanism housing from the switch housing along the first housing side and/or the housing circumferential side of the switching mechanism housing.

According to a further refinement, an inner circumferential surface of the insulator delimits the opening in the radial direction.

The opening on the first side of the switching mechanism housing is therefore then formed by the insulator. The switching mechanism unit arranged inside the switching mechanism housing is therefore well protected. The insulator arranged on the switching mechanism housing prevents the switching mechanism unit from dropping out of the switching mechanism housing, which is particularly advantageous during the bulk material storage of the switching mechanism produced in advance as a semi-finished product. In addition, this refinement has the advantage that the bimetallic snap-action disc can be supported in its high-temperature configuration on the insulator.

A diameter of the opening is preferably smaller than a diameter of the bimetallic snap-action disc which is measured in parallel.

The bimetallic snap-action disc is thus securely held in the switching mechanism housing and cannot be detached from it even in the event of corresponding shaking.

According to a further refinement, the switching mechanism is configured so as, below a response temperature of the bimetallic snap-action disc, to keep the switch in a low-temperature position in which the switching mechanism establishes via the movable contact part an electrical connection between the base body of the switching mechanism housing and the stationary contact part arranged on the switch housing, and, upon exceeding the response temperature, to move the switch to a high-temperature position in which the switching mechanism interrupts the electrical connection.

The electrical connection is interrupted in the high-temperature configuration of the switch by the bimetallic snap-action disc snapping over from its low-temperature configuration to its high-temperature configuration when its response temperature is exceeded, and thereby lifting the movable contact part off from the stationary contact.

According to a refinement, the bimetallic snap-action disc is supported in its high-temperature configuration on a supporting surface, which is arranged on the first housing side of the switching mechanism housing and is formed on the base body or on the insulator. The bimetallic snap-action disc, in the process, keeps the movable contact part at a distance from the stationary contact.

Since the switching mechanism unit, as already mentioned, is encapsulated in the switching mechanism housing and the bimetallic snap-action disc is supported in its high-temperature configuration on said supporting surface inside the switching mechanism housing, functional testing of the switching mechanism can also be carried out even when the switching mechanism is produced in advance as a semi-finished product, i.e. even before the switching mechanism is installed in the switch housing and the switch is completely mounted. The bimetallic snap-action disc can namely already take up its two temperature-dependent configurations inside the switching mechanism housing.

This is not possible in the case of conventional switches, since the bimetallic snap-action disc is supported in its high-temperature configuration on the switch housing owing to the absence of the now specially provided switching mechanism housing, and therefore functional testing is then only possible when the switch is fully installed.

According to a further refinement, the switching mechanism unit further comprises a snap-action spring disc which is coupled to the movable contact part and is supported in the low-temperature position of the switch on an internal surface arranged on the second housing side in the interior of the switching mechanism housing. Said inner surface is preferably an inner surface of the electrically conductive base body of the switching mechanism housing.

The additional provision of such a snap-action spring disc has in particular the advantage that the bimetallic snap-action disc is relieved of load as a result. In the low-temperature configuration of the switch, i.e. when the current circuit is closed via the switch, the snap-action spring disc serves as a live component according to this refinement. The bimetallic snap-action disc, on the other hand, is not a live component.

In addition, in the low-temperature position of the switch, the snap-action spring disc generates the closing pressure with which the movable contact part is pressed against the stationary contact part. The bimetallic snap-action disc, on the other hand, can be mounted virtually without any force in the low-temperature position of the switch. This has a positive effect on the service life of the bimetallic snap-action disc and ensures that the switching point, i.e. the response temperature of the bimetallic snap-action disc, does not change even after many switching cycles.

According to a further refinement, the part of the second housing side of the switching mechanism housing, which forms a freely accessible outside of the switch, comprises an outwardly arched, domed or pot-shaped portion.

This domed or pot-shaped portion of the switching mechanism housing preferably protrudes at least in part from the switch housing. At this juncture, the term "arched outwards" means that the domed or pot-shaped portion is arched outwards from the view of the switch housing, i.e. from the inside of the switch housing. The outside of the switch is arched convexly at this point.

This refinement of the switching mechanism housing makes the switch extremely pressure-stable. In addition, the domed or pot-shaped portion can be used very easily as the outer connection surface of the switch.

According to a refinement, the outwardly arched, domed or pot-shaped portion comprises a first contact surface, which lies in a plane with a second contact surface arranged on the switch housing.

Preferably, the second contact surface at least partially surrounds the first contact surface. Particularly preferably, the second contact surface completely surrounds the first contact surface.

In the case of an arrangement of the domed or pot-shaped portion, which forms a first contact surface, in a plane with a second contact surface arranged on the switch housing, the temperature-dependent switch is also suitable for installation of a surface-mounted device (SMD). The switch can then namely be very easily attached to a flat printed circuit board since the electrical contact surfaces lie in a common plane.

According to a further refinement, an intermediate space extending circumferentially between the switching mechanism housing and the switch housing is filled with insulating compound. Preferably, the insulating compound is a lacquer with which the intermediate space between the switching mechanism housing and the switch housing is filled.

This seals the inside of the switch, in which the switching mechanism is located, extremely well. In addition, the insulating and sealing compound ensures a mechanically stable fastening of the switching mechanism housing in the switch housing.

It is understood that the features mentioned above and the features yet to be discussed below may be used not only in the respectively specified combination but also in other combinations or individually without departing from the spirit and scope of the present disclosure.

DESCRIPTION OF PREFERRED EMBODIMENTS

Figure 1:
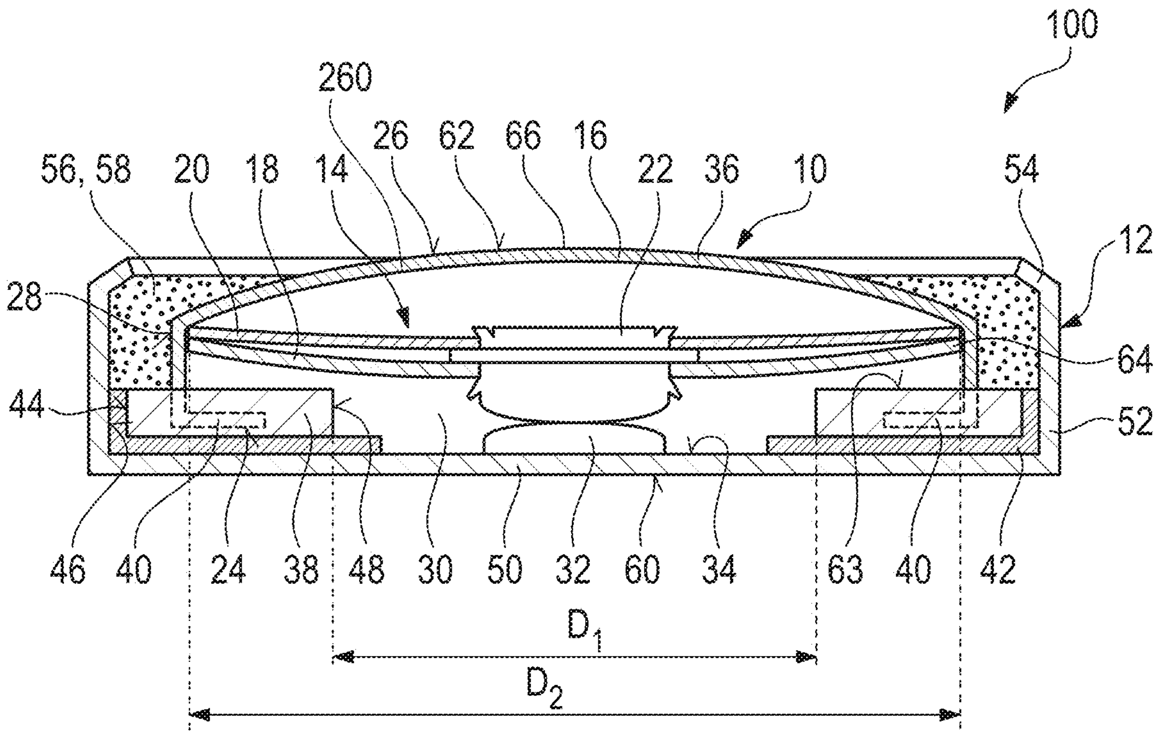
FIG. 1 shows a schematic sectional view of the temperature-dependent switch according to a first exemplary embodiment, the switch being shown in its low-temperature position.
Figure 2:
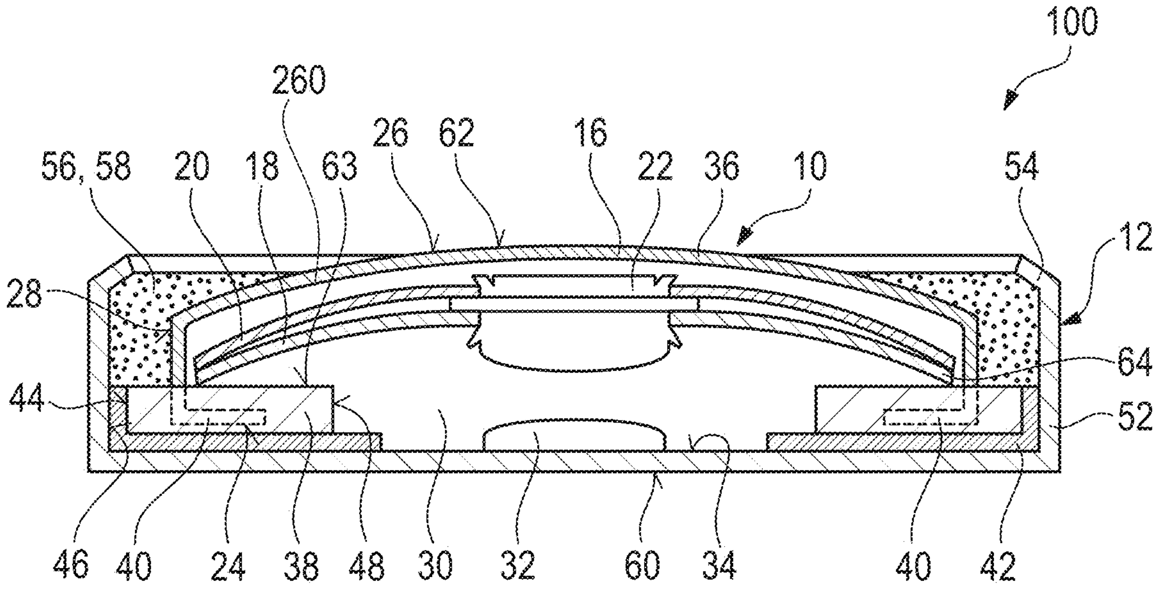
FIG. 2 shows a schematic sectional view of the switch shown in FIG. 1, the switch being shown in its high-temperature position.

FIGS. 1-2 show a first exemplary embodiment of the switch in each case in a schematic sectional view. The switch is identified therein in its entirety in each case by the reference number 100.

The switch 100 comprises a temperature-dependent switching mechanism 10, which is arranged in an electrically conductive switch housing 12.

The switching mechanism 10 comprises a functional switching mechanism unit 14 and a switching mechanism housing 16 surrounding said switching mechanism unit 14. The switching mechanism housing 16 surrounds the switching mechanism unit 14 at least partially from all six spatial directions. However, as explained in detail below, the switching mechanism housing 16 is designed as a partially open housing, and therefore the switching mechanism unit 14 is accessible from outside the switching mechanism housing 16 from at least one spatial direction, preferably from only one spatial direction.

Owing to the fact that the switching mechanism housing 16 at least partially surrounds the switching mechanism unit 14 from all six spatial directions, the switching mechanism unit 14 is held captively in the switching mechanism housing 16. The switching mechanism unit 14 therefore cannot be detached from the switching mechanism housing 16.

As long as the switching mechanism 10 is not installed in the switch 100 or its switch housing 12, there is preferably a certain clearance between the switching mechanism unit 14 and the switching mechanism housing 16. However, the switching mechanism unit 14 is firmly braced in the installed state of the switch 100 shown in FIG. 1. In the low-temperature position of the switch 100 shown in FIG. 1, the switching mechanism unit 14 is clamped between the switch housing 12 and the switching mechanism housing 16.

The switching mechanism unit 14 is constructed in three parts according to the present exemplary embodiment. The switching mechanism unit 14 comprises a temperature-dependent bimetallic snap-action disc 18, a temperature-independent snap-action spring disc 20 and a movable contact part 22. The bimetallic snap-action disc 18 and the snap-action spring disc 20 are held captively on the contact part 22. The switching mechanism unit 14 can thus be produced in advance as a semi-finished product and then inserted as a whole into the switching mechanism housing 16 (see FIG. 4A).

The switching mechanism 10 together with the switching mechanism unit 14 and the switching mechanism housing 16 also form a semi-finished product for the temperature-dependent switch 100 produced from it later on. Since the three components 18, 20, 22 of the switching mechanism unit 14 are connected captively to one another and the switching mechanism unit 14 is held captively in the switching mechanism housing 16, the switching mechanism 10 can be kept in stock as bulk material until it is installed in the temperature-dependent switch 100.

The switching mechanism housing 16 surrounds the switching mechanism unit 14 from a first housing side 24, from a second housing side 26 opposite the first housing side 24, and also from a housing circumferential side 28 extending between and transversely to the first and the second housing sides 24, 26.

Preferably, the switching mechanism housing 16 completely surrounds the switching mechanism unit 14 both from the second housing side 26 and from the housing circumferential side 28. The second housing side 26 and the housing circumferential side 28 thus preferably form closed housing sides of the switching mechanism housing 16. Only the first housing side 24 is a partially open housing side of the switching mechanism housing 16.

In other words, the housing circumferential side 28 surrounds the switching mechanism unit 14 along the entire circumference, i.e. from a total of four spatial directions oriented orthogonally with respect to one another. Furthermore, the switching mechanism housing 16 completely surrounds the switching mechanism unit 14 from a further spatial direction, namely from a spatial direction oriented orthogonally to the second housing side 26. Only from the sixth spatial direction, which is oriented orthogonally to the first housing side 24, does the switching mechanism housing 16 only partially surround the switching mechanism unit 14.

On the first housing side 24, the switching mechanism housing 14 comprises an opening 30 through which the movable contact part 22 is accessible from outside the switching mechanism housing 16. Through said opening 30 in the switching mechanism housing 16, the movable contact part 22 of the switching mechanism 10 cooperates with a stationary contact part 32, which is arranged on an inner side 34 of the switch housing 12.

A diameter D1 of the opening 30 is smaller than a diameter D2, measured parallel thereto, of the bimetallic snap-action disc 18 and/or of the snap-action spring disc 20. Thus, although the movable contact part 22 is accessible from outside the switching mechanism housing 16 through the opening 30, the bimetallic snap-action disc 18 and the snap-action spring disc 20 cannot, however, become detached from the switching mechanism housing 16 or emerge therefrom.

The switching mechanism housing 16 comprises a base body 36, which is formed from an electrically conductive material, for example, from metal. In the exemplary embodiment shown here, said electrically conductive base body 36 forms the second housing side 26 and the housing circumferential side 28 of the switching mechanism housing 16.

An upper part of the base body 36, which forms the second housing side 26, simultaneously forms a freely accessible outside of the switch 100. The first housing side 24 and the housing circumferential side 28 are arranged completely within the switch housing 12 and are therefore not accessible from outside the switch 100.

The first housing side 24 of the switching mechanism housing 16 is formed by an insulator 38 according to the exemplary embodiment shown in FIGS. 1 and 2. It may be a plastics insulator, for example. The insulator 38 is fastened to the base body 36 of the switching mechanism housing 16 on the underside of the switching mechanism housing 16. For this purpose, a plurality of holding claws 40 are provided, which are shown by dashed lines in FIGS. 1 and 2.

The base body 36 of the switching mechanism housing 16 is preferably integrally formed in one piece. The holding claws 40 are preferably integrally connected to the base body 36.

According to the exemplary embodiment shown in FIGS. 1 and 2, the switching mechanism housing 16 is thus constructed in two parts, with the base body 36 and the insulator 38 fastened thereto, Of course, other types of holding elements can be used instead of holding claws 40 to connect the insulator 38 to the base body 36. The base body 36 can equally also be adhesively bonded to the insulator 38.

The insulator 38 is designed as an annular body. Its shape is preferably adapted to the shape of the switching mechanism housing 12. The insulator 38 rests on the inside 34 of the base of the switch housing 12 with the interposition of an insulating film 42. Although the insulating film 42 improves the electrical insulation as well as the seal-tightness of the switch 100, it is not absolutely necessary.

The insulator 38 lies with its outer circumferential surface 44 on an inner circumferential surface 46 of the switch housing 12 (either directly or with the interposition of the insulating film 42). An inner circumferential surface 48 of the insulator 38 delimits the opening 30, which is provided on the first housing side 24 of the switching mechanism housing 16, in the radial direction.

During the manufacturing of the switch 100, the switching mechanism housing 16 is inserted together with the insulator 38 into the switch housing 12. The switch housing 12 is preferably formed in one piece from an electrically conductive material, preferably from metal. The switch housing 12 is pot-like. It comprises a base 50 and a side wall 52 encircling the latter transversely, in the circumferential direction, the upper edge 54 of which, after insertion of the switching mechanism housing, is bent over inwards in the direction of the central axis of the switching mechanism housing in order to fix the switching mechanism housing 16 in the switch housing 12.

The intermediate space 56 between the switching mechanism housing 16 and the switch housing 12 is filled with insulating compound 58. The insulating compound 58 provides a mechanical seal that prevents liquids or contaminants from entering the inside of the switch 100 from the outside. This results in a sealed switch housing 12, in which the switching mechanism housing 16 is held captively.

Since the switching mechanism housing 12 and the base body 36 of the switching mechanism housing 16 are each made of electrically conductive material, thermal contact can be made via their outer surfaces to an electrical device to be protected.

The outer surfaces also serve for the electrical connection of the switch 100 at the same time. For example, the outside 60 of the base 50 of the switch housing 12 can act as a first electrical connection and the outside 62 of that part of the base body 36 of the switching mechanism housing 16 which is freely accessible from the outside on the second housing side 26 can act as a second electrical connection.

In the assembled state of the switch 100, the switching mechanism 10 is clamped between the base body 36 of the switching mechanism housing 16 and the switch housing 12. The insulator 38 provides electrical insulation of the base body 36 of the switching mechanism housing 16 from the switch housing 12.

This ensures that an electrical contact produced by the switch 100 between the switch housing 12 and the switching mechanism housing 16 can be produced only via the switching mechanism 10. Said electrical contact between the switch housing 12 and the switching mechanism housing 16 that is produced via the switch 100 is produced by the switching mechanism 10 only in the low-temperature position of the switch 100 (see FIGS. 1 and 2).

In the low-temperature position of the switch 100 that is shown in FIG. 1, the temperature-independent snap-action spring disc 20 is in its first configuration and the temperature-dependent bimetallic snap-action disc 18 is in its low-temperature configuration. The snap-action spring disc 20 presses the movable contact part 22 against the stationary contact part 32, which acts as a mating contact. The switch 100 is thus in its closed position, in which an electrically conductive connection between the outside 62 of the switching mechanism housing 16, which acts as a first switch connection, and the outside 60 of the switch housing 12, which acts as a second switch connection, is produced via the snap-action spring disc 20, the movable contact part 22 and the stationary contact part 32. The snap-action spring disc 20 is supported in the low-temperature position of the switch on an internal surface 260 arranged on the second housing side 26 in the interior of the switching mechanism housing. Said internal surface 260 is preferably an inner surface of the electrically conductive base body 36 of the switching mechanism housing 16.

The contact pressure between the movable contact part 22 and the stationary contact part 32 is produced by the snap-action spring disc 20. In this state, the bimetallic snap-action disc 18 is by contrast mounted virtually without any force in the switching mechanism housing 16.

If the temperature of the device to be protected and thus the temperature of the switch 100 and the bimetallic snap-action disc 18 arranged therein increases to the switching temperature of the bimetallic snap-action disc 18 or above the switching temperature, the bimetallic snap-action disc 18 snaps over from its concave low-temperature position shown in FIG. 1 into its convex high-temperature position shown in FIG. 2. During said snapping-over, the bimetallic snap-action disc 18 is supported with its outer edge 64 on a supporting surface arranged on the upper side of the insulator 38. This means that the snap-action spring disc 20 is simultaneously deflected upwards at its center such that the snap-action spring disc 20 snaps over from its first stable geometric configuration shown in FIG. 1 into its second geometrically stable configuration shown in FIG. 2.

FIG. 2 shows the high-temperature position of the switch 100, in which the latter is open. The current circuit is therefore interrupted.

When the device to be protected and thus the switch 100 together with the bimetallic snap-action disc 18 then cool again, the bimetallic snap-action disc 18 snaps over again into its low-temperature position when the switching-back temperature, which is also referred to as the return temperature, is reached, as is shown for example in FIG. 1. This allows a reversible switching behavior to be realized.

Of course, it is also possible for switching-back of the switch 100 after a snap-over into the high-temperature position has taken place to be prevented by a corresponding closing lock. Such closing locks are used in particular for single-use switches in which switching-back is intended to be prevented.

It is also possible to provide the switching mechanism unit 14 without a snap-action spring disc 20. In such a case, the switching mechanism unit 14 then "only" comprises the bimetallic snap-action disc 18 and the movable contact part 22. The bimetallic snap-action disc 18 then not only ensures the switching behavior, but also simultaneously generates the contact pressure between the movable contact part 22 and the stationary contact part 32 in the low-temperature position of the switch 100. The bimetallic snap-action disc 18 is then therefore used as a live component of the switching mechanism 10.

Figure 3:
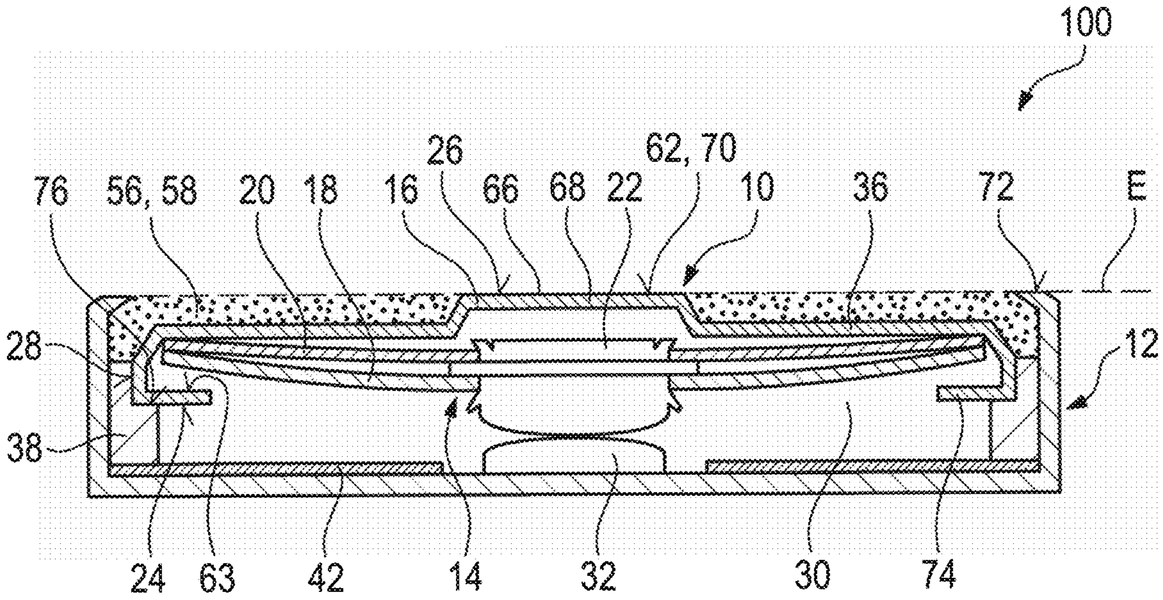
FIG. 3 shows a schematic sectional view of the temperature-dependent switch according to a second exemplary embodiment, the switch being shown in its low-temperature position.

FIG. 3 shows a schematic sectional view of a second exemplary embodiment of the switch 100, In this regard, essentially the differences over the switch 100 according to the first exemplary embodiment shown in FIGS. 1 and 2 will be explained below. Since the general manner of operation of the switch 100 shown in FIG. 3 does not differ from the switch 100 shown in FIGS. 1 and 2, this is not explicitly addressed again.

One difference of the switch 100 shown in FIG. 3 according to the second exemplary embodiment resides in its even flatter design. In particular, the switching mechanism housing 16 is even flatter here. While that part of the second housing side 26 of the switching mechanism housing 16 which forms a freely accessible outside of the switch 10 comprises a domed portion 66 in FIG. 1, said part 68 of the switching mechanism housing 16 is pot-shaped according to the exemplary embodiment shown in FIG. 3. Said pot-shaped portion 68 comprises a (flat) first contact surface 70 on its upper side, said contact surface being arranged in a plane E with a second contact surface 72 arranged on the switch housing 12. Said two contact surfaces 70, 72 are suitable for SMD mounting of the switch 100. The switch 100 can thus be mounted very easily upside down, as it were, on a flat printed circuit board.

The second contact surface 72, which is arranged on the surface of the switch housing 12, preferably completely surrounds the first contact surface 70 along the entire periphery of the switch 100. The first contact surface 70 is preferably circular. The second contact surface 72 is preferably configured in a circular ring shape.

Also in the switch interior, the switching mechanism housing 16 is flatter according to the second exemplary embodiment shown in FIG. 3. The base body 36 of the switching mechanism housing 16 is in turn integrally formed in one piece from an electrically conductive material, for example from metal. Also in this embodiment, the switching mechanism unit 14 is encapsulated in the switching mechanism housing 16. The switching mechanism housing 16 surrounds the switching mechanism unit 14 at least partially from all six spatial directions. The first housing side 24 of the switching mechanism housing 16 is in turn designed as a partially open housing side, which comprises a central opening 30 through which the movable contact part 22 directly interacts with the stationary contact part 32. In the low-temperature position of the switch 100 that is shown in FIGS. 1 and 3, the movable contact part 22 contacts the stationary contact part 32 through the opening 30.

The opening 30 is delimited in the radial direction by the base body 36 of the switching mechanism housing 16. On the first housing side 24, the base body 36 of the switching mechanism housing 16 comprises an inwardly folded-over, circumferential edge 74. Instead of such an edge 74, however, individual webs which protrude radially inwards from the housing circumferential side 28 may also be provided.

The edge 74 or the aforementioned webs serve as a counterholder for the bimetallic snap-action disc 18 according to the exemplary embodiment shown in FIG. 3. The edge 74 comprises a supporting surface 63, on which the bimetallic snap-action disc 18 can be supported in its high-temperature position.

In contrast to the first exemplary embodiment shown in FIGS. 1 and 2, the bimetallic snap-action disc 18 is no longer supported in its high-temperature position on the insulator 38, but rather on the base body 36 of the switching mechanism housing 16 itself, namely on the edge 74 or the aforementioned webs.

Another difference resides in the somewhat different design of the insulator 38. The insulator 38 is also configured here as an annular body, the outer circumferential surface of which abuts the inner circumferential surface of the switch housing 12. The insulator 38 is, however, approximately L-shaped in cross section here. The base body of the switching mechanism housing 16 rests on an inner circumferential shoulder 76 of the insulator 38.

Also according to this embodiment, it is preferred for the insulator 38, as part of the switching mechanism housing 16, to be inserted as a common unit into the switch housing 12 during the manufacturing of the switch 100. The insulator 38 is therefore also preferably connected here to the base body 36 of the switching mechanism housing 16. This connection can be made by means of one or more holding elements, for example at least one holding claw. Alternatively, the insulator 38 can be adhesively bonded, welded or soldered to the base body 36 of the switching mechanism housing 16.

Figure 4A:
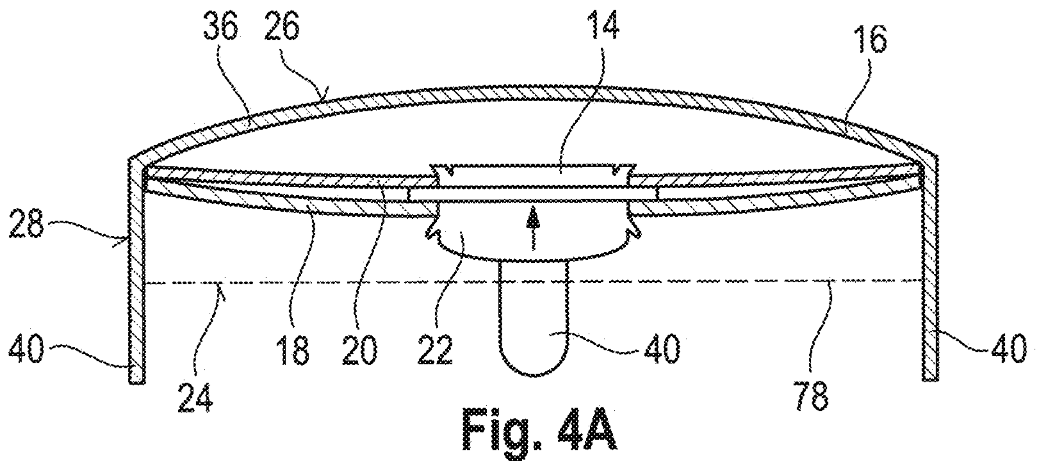
FIGS. 4A-4C show schematic sectional views illustrating individual processing steps during the manufacturing of the temperature-dependent switch according to the exemplary embodiment shown in FIG. 1.
Figure 4B:
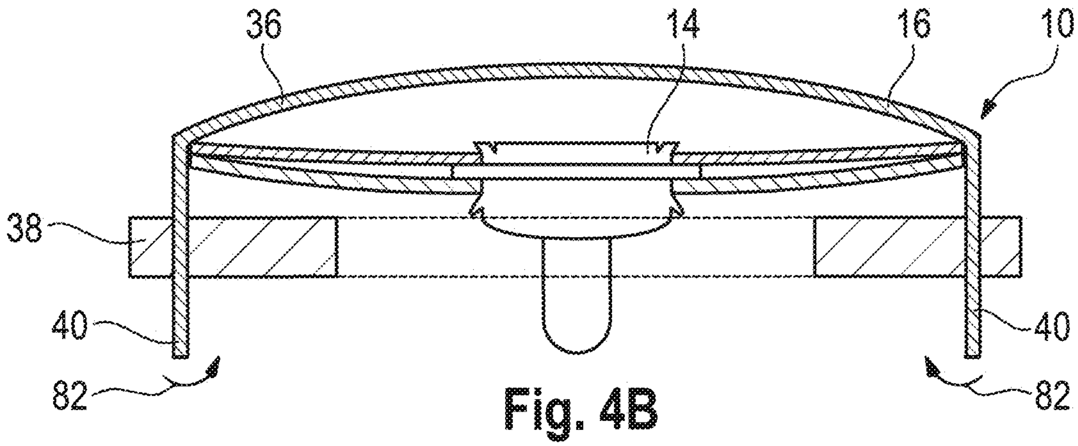
Figure 4C:
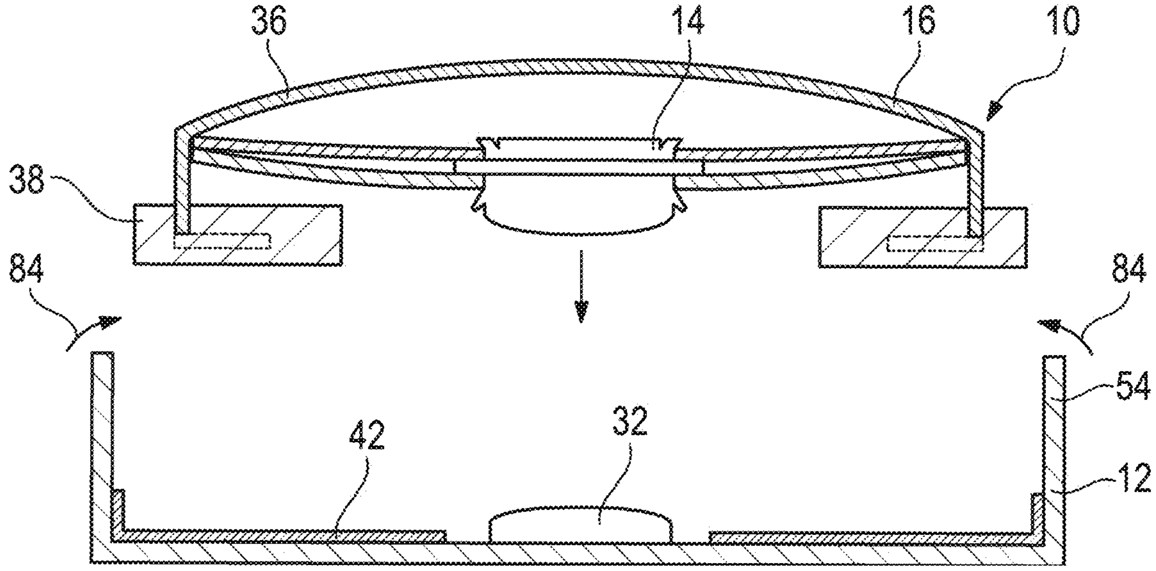

FIGS. 4A-C schematically illustrate a plurality of working steps proceeding sequentially one after another in the installation of the switch 100 according to the first exemplary embodiment.

In a first installation step, the switching mechanism unit 14, which comprises the bimetallic snap-action disc 19, the snap-action spring disc 20 and the movable contact part 20, is inserted into the base body 36 of the switching mechanism housing 16 from below. The preformed base body 36 can be configured, for example, as a deep-drawn component. In FIG. 4A, the first housing side 25 is still completely open, and therefore the switching mechanism unit 14 can be easily inserted from below. A part of the housing circumferential side 28 as well as the second housing side 26 are designed as closed housing sides. From the housing circumferential side 28, a plurality of preformed holding claws 74 protrude perpendicularly downwards, approximately starting from the dashed line 78.

In a second assembly step, the insulator 38 is then pushed onto the holding claws 40. For this purpose, the insulator 38 preferably comprises a plurality of through bores 8 which are distributed over the circumference and through which the holding claws are inserted. The holding claws 40 are then folded over inwards, as indicated by the arrows 82, in order to fix the insulator 38 to the base body 36 of the switching mechanism housing 16. The switching mechanism 10 is therefore completed.

Figure 5:
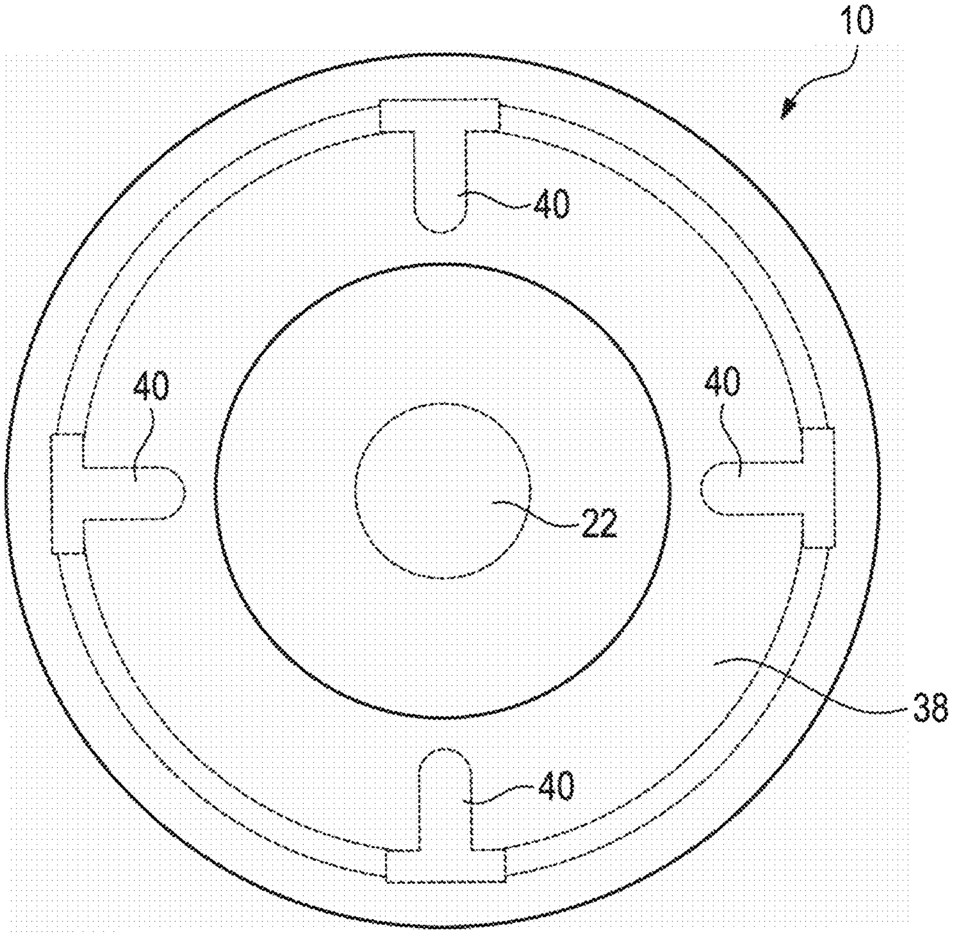
FIG. 5 shows a schematic top view from below of the switching mechanism used in the temperature-dependent switch according to the first exemplary embodiment shown in FIG. 1.

The completed switching mechanism 10, which can be stored as a semi-finished product in bulk material storage, is shown in the upper part of FIG. 4C. FIG. 5 shows a top view from below of the switching mechanism 10, as a result of which in particular the aforementioned manner of fastening the insulator 38 to the base body 36 of the switching mechanism housing 16 can be seen once again.

In the final installation step, which is shown in FIG. 4C, the switching mechanism 10, which is produced in advance as a semi-finished product, is inserted into the switch housing 12 and the switch housing 12 is closed by folding over of the upper edge 54 (see arrows 84).

As a final method step, not shown here, the insulating and sealing compound 58 is introduced into the intermediate space 56 between the switching mechanism housing 16 and the switch housing 12.

What is claimed is:

1. A temperature-dependent switch), comprising:

a temperature-dependent switching mechanism having a switching mechanism unit, which comprises a movable contact part coupled to a bimetallic snap-action disc, and having a switching mechanism housing, in which the switching mechanism unit is arranged and held captively therein;

a switch housing, in which the switching mechanism housing is arranged and held captively therein, wherein the switch housing comprises a stationary contact part, which acts as a mating contact to the movable contact part; and an insulator arranged inside the switch housing, wherein the switching mechanism housing comprises an electrically conductive base body, which surrounds the switching mechanism unit from a first housing side, a second housing side opposite the first housing side, and a housing circumferential side extending between and transversely to the first and the second housing sides, wherein the first housing side is a partially open housing side, wherein the switching mechanism housing on the first housing side comprises an opening through which the movable contact part interacts with the stationary contact part, wherein the electrically conductive base body forms at least part of the second housing side, said at least part of the second housing side forming a freely accessible outside of the temperature-dependent switch, and wherein the insulator electrically insulates the electrically conductive base body of the switching mechanism housing from the switch housing.

2. The temperature-dependent switch according to claim 1, wherein the insulator comprises an annular body.

3. The temperature-dependent switch according to claim 1, wherein the insulator is fastened to the electrically conductive base body of the switching mechanism housing.

4. The temperature-dependent switch according to claim 3, wherein at least one holding element is formed on the electrically conductive base body of the switching mechanism housing, and wherein the insulator is fastened to the electrically conductive base body by means of the at least one holding element.

5. The temperature-dependent switch according to claim 1, wherein the electrically conductive base body of the switching mechanism housing is integrally formed in one piece.

6. The temperature-dependent switch according to claim 1, wherein an outer circumferential surface of the insulator abuts an inner circumferential surface of the switch housing.

7. The temperature-dependent switch according to claim 1, wherein the insulator forms at least a part of the housing circumferential side of the switching mechanism housing and/or at least a part of the first housing side of the switching mechanism housing.

8. The temperature-dependent switch according to claim 1, wherein an inner circumferential surface of the insulator radially delimits the opening.

9. The temperature-dependent switch according to claim 1, wherein a diameter of the opening is smaller than a diameter of the bimetallic snap-action disc that is measured parallel to the diameter of the opening.

10. The temperature-dependent switch according to claim 1, wherein the temperature-dependent switching mechanism is configured so as, below a response temperature of the bimetallic snap-action disc, to keep the temperature-dependent switch in a low-temperature position in which the temperature-dependent switching mechanism establishes via the movable contact part an electrical connection between the electrically conductive base body of the switching mechanism housing and the stationary contact part arranged on the switch housing, and, upon exceeding the response temperature, to move the temperature-dependent switch to a high-temperature position in which the temperature-dependent switching mechanism interrupts the electrical connection.

11. The temperature-dependent switch according to claim 10, wherein the switching mechanism unit further comprises a snap-action spring disc which is coupled to the movable contact part and is supported in the low-temperature position of the temperature-dependent switch on an internal surface arranged on the second housing side in an interior of the switching mechanism housing.

12. The temperature-dependent switch according to claim 10, wherein the bimetallic snap-action disc is configured to snap over from a geometrically stable low-temperature configuration to a geometrically stable high-temperature configuration upon exceeding the response temperature, and wherein the bimetallic snap-action disc is supported in its high-temperature configuration on a supporting surface, which is arranged on the first housing side of the switching mechanism housing and is formed on the electrically conductive base body or on the insulator, and thereby keeps the movable contact part at a distance from the stationary contact part.

13. The temperature-dependent switch according to claim 1, wherein the at least part of the second housing side of the switching mechanism housing, which forms the freely accessible outside of the temperature-dependent switch, comprises an outwardly arched, domed or pot-shaped portion.

14. The temperature-dependent switch according to claim 13, wherein the outwardly arched, domed or pot-shaped portion comprises a first contact surface, which lies in a common plane with a second contact surface arranged on the switch housing.

15. A temperature-dependent switch, comprising:

a temperature-dependent switching mechanism having a switching mechanism unit, which comprises a movable contact part coupled to a bimetallic snap-action disc, and having a switching mechanism housing, in which the switching mechanism unit is arranged and held captively therein;

a switch housing, in which the switching mechanism housing is arranged and held captively therein, wherein the switch housing comprises a stationary contact part, which acts as a mating contact to the movable contact part; and an insulator arranged inside the switch housing, wherein the switching mechanism housing surrounds the switching mechanism unit from a first housing side, a second housing side opposite the first housing side, and a housing circumferential side extending between and transversely to the first and the second housing sides, wherein the first housing side is a partially open housing side, wherein the switching mechanism housing on the first housing side comprises an opening through which the movable contact part interacts with the stationary contact part, wherein the switching mechanism housing comprises an electrically conductive base body, which forms at least part of the second housing side, said at least part of the second housing side forming a freely accessible outside of the temperature-dependent switch, wherein the insulator electrically insulates the electrically conductive base body of the switching mechanism housing from the switch housing, and wherein an intermediate space extending circumferentially between the switching mechanism housing and the switch housing is filled with insulating compound.

16. A temperature-dependent switch, comprising:

a temperature-dependent switching mechanism having a switching mechanism unit, which comprises a movable contact part coupled to a bimetallic snap-action disc, and having a switching mechanism housing, in which the switching mechanism unit is arranged and held captively therein;

a switch housing, in which the switching mechanism housing is arranged and held captively therein, wherein the switch housing comprises a stationary contact part, which acts as a mating contact to the movable contact part; and an insulator arranged inside the switch housing, inaccessible from an outside of the temperature-dependent switch, wherein the switching mechanism housing surrounds the switching mechanism unit from a first housing side, a second housing side opposite the first housing side, and a housing circumferential side extending between and transversely to the first and the second housing sides, wherein the first housing side is a partially open housing side, wherein the switching mechanism housing on the first housing side comprises an opening through which the movable contact part interacts with the stationary contact part, wherein the switching mechanism housing comprises an electrically conductive base body, which forms at least part of the second housing side, said at least part of the second housing side forming a freely accessible outside of the temperature-dependent switch, and wherein the insulator electrically insulates the electrically conductive base body of the switching mechanism housing from the switch housing.

* * * * *